United States Patent
Sugiura et al.

(10) Patent No.: US 7,323,269 B2
(45) Date of Patent: Jan. 29, 2008

(54) FUEL CELL

(75) Inventors: Seiji Sugiura, Utsunomiya (JP); Ryugo Suzuki, Nishiibaraki-gun (JP); Narutoshi Sugita, Utsunomiya (JP); Hiroyuki Tanaka, Utsunomiya (JP); Takashi Kuwayama, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 644 days.

(21) Appl. No.: 10/771,707

(22) Filed: Feb. 4, 2004

(65) Prior Publication Data
US 2004/0157106 A1 Aug. 12, 2004

(30) Foreign Application Priority Data
Feb. 4, 2003 (JP) .............................. 2003-027661

(51) Int. Cl.
H01M 2/00 (2006.01)
H01M 2/02 (2006.01)
H01M 2/08 (2006.01)

(52) U.S. Cl. .......................................... 429/37; 429/34

(58) Field of Classification Search ..................... None
See application file for complete search history.

(56) References Cited

U.S. PATENT DOCUMENTS 5,543,241 A 8/1996 Nishioka et al.
5,686,200 A * 11/1997 Barton et al. .................. 429/37
6,087,033 A * 7/2000 Grune et al. ................... 429/37
6,306,533 B1 10/2001 Mund et al.

FOREIGN PATENT DOCUMENTS

| JP | 02-160372 | 6/1990 |
|---|---|---|
| JP | 7-29580 A1 | 1/1995 |
| JP | 07-029592 | 1/1995 |
| JP | 09-092324 | 4/1997 |
| JP | 2000-012067 | 1/2000 |
| JP | 2002-231273 | 8/2002 |

\* cited by examiner

Primary Examiner—Patrick Joseph Ryan
Assistant Examiner—Julian Mercado
(74) Attorney, Agent, or Firm—Lahive & Cockfield, LLP; Anthony A. Laurentano, Esq.

(57) ABSTRACT

A fuel cell includes a plurality of metal clip members for holding outer regions of first and second metal separators at a plurality of positions. Each of the metal clip member includes a side plate and first and second holding portions. The side plate is curved at opposite ends, and the first and second holding portions are extending from the opposite ends of the side plate. The first and second holding portions generates a predetermined elastic force for holding the first and second metal separators. The outer ends of the first and second metal separators are covered by insulating sections, and the insulating sections are held between the first and second holding portions so that the entire unit cell is tightened by the predetermined elastic force.

8 Claims, 10 Drawing Sheets

FUEL CELL

BACKGROUND OF THE INVENTION

1. Field of the Invention

The present invention relates to a fuel cell including at least one unit cell. The unit cell includes an electrolyte electrode assembly, and first and second separators for sandwiching the electrolyte electrode assembly. The electrolyte electrode assembly includes a pair of electrodes and an electrolyte interposed between the electrodes.

2. Description of the Related Art

For example, a solid polymer electrolyte fuel cell employs a membrane electrode assembly (MEA) which includes two electrodes (anode and cathode), and an electrolyte membrane interposed between the electrodes. The electrolyte membrane is a polymer ion exchange membrane. The membrane electrode assembly is interposed between a pair of separators. The membrane electrode assembly and the separators make up a unit cell for generating electricity.

In the unit cell, a fuel gas (reactant gas) such as a gas chiefly containing hydrogen (hydrogen-containing gas) is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. A gas chiefly containing oxygen (oxygen-containing gas) or air is supplied to the cathode. At the cathode, the hydrogen ions from the anode combine with the electrons and oxygen to produce water.

Generally, several tens to hundreds of unit cells are stacked together to form a stack of the fuel cell. These unit cells need to be in alignment with each other accurately. In order to achieve the accurate positioning of the unit cells, typically, a knock pin is inserted in each of positioning holes formed in the unit cells. When a large number of the unit cells are stacked together, the operation of inserting the knock pins into the holes of the unit cells is laborious, and the fuel cell can not be assembled efficiently. Positional displacement between components may occur undesirably, and the desired sealing performance may not be achieved.

In an attempt to address the problem, techniques as disclosed in Japanese laid-open patent publication No. 2000-12067 and Japanese laid-open patent publication No. 7-29580 are proposed. Japanese laid-open patent publication No. 2000-12067 discloses a solid polymer electrolyte fuel cell 1 shown in FIG. 9. The fuel cell 1 includes a unit cell 2 and separators 3a, 3b for sandwiching the unit cell 2. The unit cell 2 includes a solid polymer electrolyte membrane 2a, an anode 2b provided on one surface of the solid polymer electrolyte membrane 2a, and a cathode 2c provided on the other surface of the solid polymer electrolyte membrane 2a.

Figure 9:
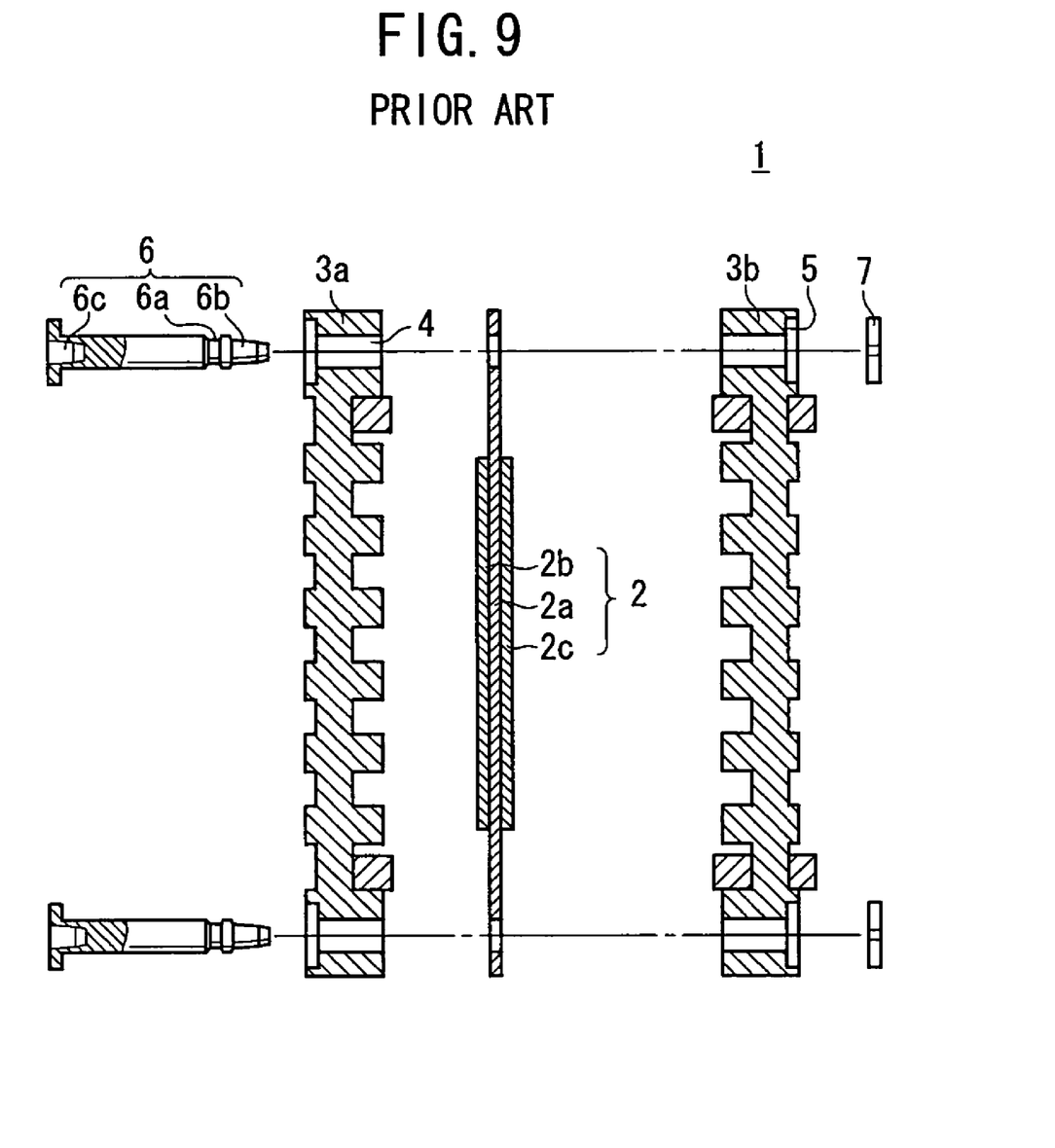
FIG. 9 is a view showing a fuel cell disclosed in Japanese laid-open patent publication No. 2000-12067.

Holes 4 extend through the fuel cell 1 in a stacking direction of the fuel cell 1 for inserting holding pins 6. The separator 3b has openings 5 for inserting snap rings 7. The holding pin 6 has a snap ring attachment groove 6a. The holding pin 6 is inserted into the hole 4, the snap ring 7 is inserted into the opening 5, and the snap ring 7 is fitted to the snap ring attachment groove 6a. At one end of the holding pin 6, a chamfered tip 6b is formed. At the other end of the holding pin 6, a hole 6c for inserting the tip 6b of another holding pin 6 is formed.

As described above, in the system of the fuel cell 1, the holding pin 6 is inserted into the hole 4, and the snap ring 7 is inserted into the opening 5. The snap ring 7 is fitted to the snap ring attachment groove 6a for tightening the fuel cell 1.

Thus, the tip 6b of the holding pin 6 projecting from the outer surface of the separator 3b is fitted to the hole 6c of another holding pin. 6 which tightens another fuel cell 1. In this manner, the adjacent fuel cells 1 are stacked in alignment with each other.

Figure 10:
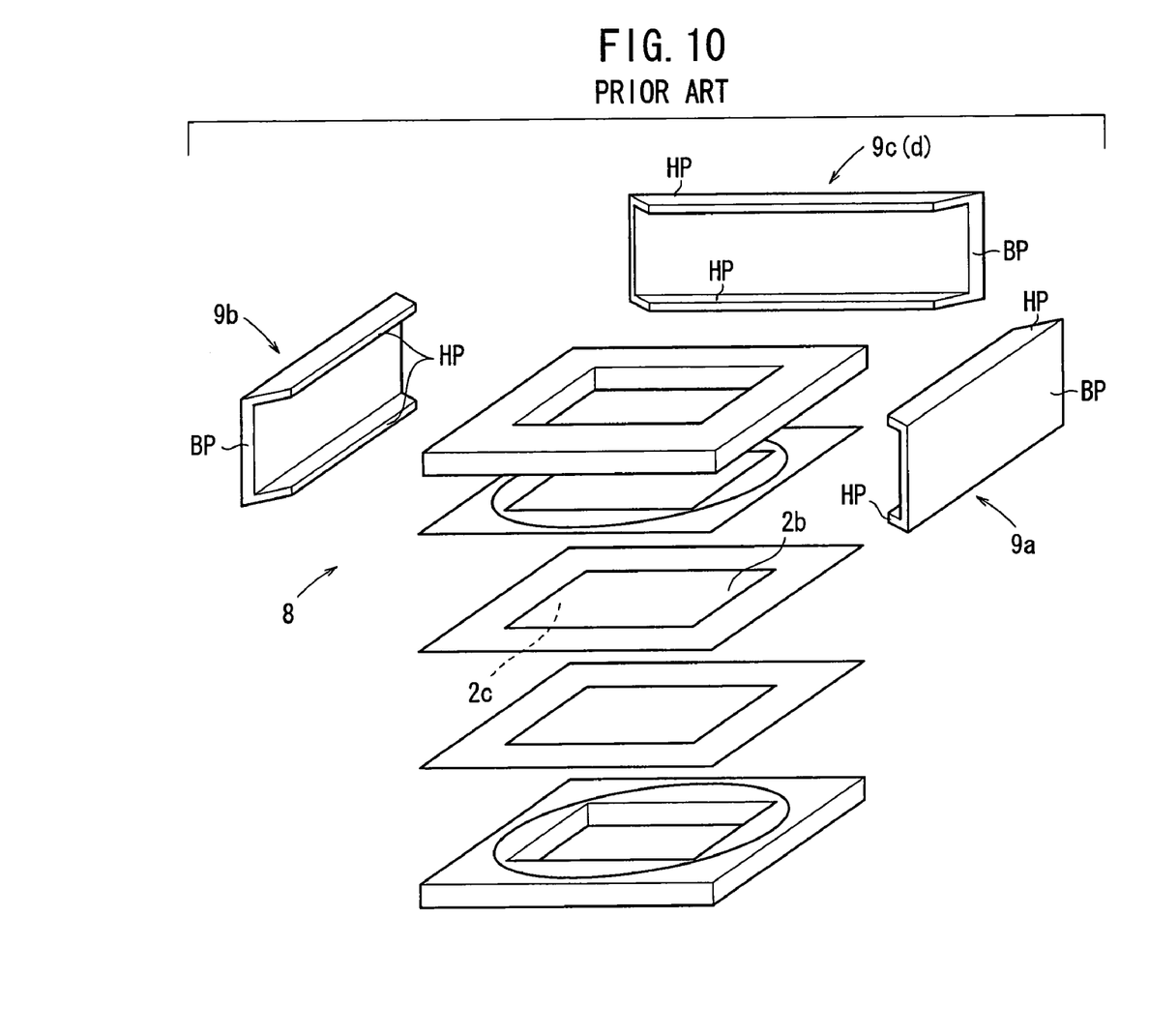
FIG. 10 is a view showing a fuel cell disclosed in Japanese laid-open patent publication No. 7-29580.

Further, Japanese laid-open patent publication No. 7-29580 discloses a fuel cell shown in FIG. 10. The fuel cell includes a unit cell 8 of a rectangular parallelpiped. A pair of terminals 9a, 9b are provided on opposite sides of the unit cell 8. The terminal 9a is connected to an anode b, and the terminal 9b is connected to a cathode 2c. Further, holding members 9c, 9d are provided on opposite sides of the unit cell 8 in another direction. The components of the unit cell 8 are fastened together by the terminals 9a, 9b and the holding members 9c, 9d.

According to the disclosure of Japanese laid-open patent publication No. 2000-12067, a plurality of the holding pins 6 need to be inserted into the holes 4 for each of the unit cells 2. Further, the snap rings 7 need to be fitted to the respective snap ring attachment grooves 6a of the holding pins 6. Thus, when a large number of unit cells 2 are stacked together, operation of assembling the holding pins 6 and the snap rings 7 is considerably laborious, and can not be performed efficiently.

According to the disclosure of Japanese laid-open patent publication No. 7-29580, each of the terminals 9a, 9b, and the holding members 9c, 9d has two holding portions HP extending from a base plate BP for holding the unit cell 8. The length of the holding portions HP is shorter than the length of the base plate BP. The unit cell 8 may not be held reliably between the holding portions HP. Thus, the terminals 9a, 9b, and the holding members 9a, 9b are disengaged easily from the unit cell 8.

The terminals 9a, 9b, and the holding members 9c, 9d cover the entire circumferential side surfaces of the unit cell 8. Therefore, the fuel cell is large and heavy. Further, the holding portions HP are overlapped with each other when the unit cells 8 are stacked. The dimension of the fuel cell in the stacking direction is large by the thickness of the holding portions HP stacked to cover the unit cells 8.

SUMMARY OF THE INVENTION

A main object of the present invention is to provide a fuel cell with a compact and simple structure in which unit cells are reliably fastened together, and the fuel cell can be assembled easily.

According to the present invention, a plurality of metal clip members are provided for holding outer regions of first and second separators at a plurality of positions. Each of the metal clip members includes a side plate curved at opposite ends, and first and second holding portions extending from the opposite ends of the side plate. The length of the first and second holding portions is greater than the length of the side plate, so that the first and second separators are tightened together between the first and second holding portions by an elastic force applied by the first and second holding portions.

Since the metal clip member has relatively long first and second holding portions, the outer regions of first and second separators are securely fastened by the first and second holding portions. Therefore, it is possible to effectively prevent the metal clip member from being detached from the first and second separators. The first and second holding portions are long in comparison with the side plate of the metal clip member. The first and second holding portions have the elasticity to securely tighten the first and second separators. Thus, the unit cell can be assembled efficiently, and the number of steps for assembling the unit cell is small. The sealing performance can be maintained in handling the unit cell, and the unit cell can be handled efficiently. In the unit cell, the membrane electrode assembly is interposed between the first and second separators. The humidity at the membrane electrode assembly is kept at a desired level. The membrane electrode assembly is not dried, and the desired performance of the unit cell is maintained.

The first and second holding portions may have edges curved or bent away from each other. Thus, the first and second separators can be inserted between the edges of the first and second holding portions smoothly. The metal clip members can be attached to the first and second separators simply and reliably.

The fuel cell may include first and second unit cells stacked together in a stacking direction. Each of the first and second unit cells may include a clip attachment section for attaching the metal clip member. The metal clip member attached to the clip attachment section of the first unit cell is not in alignment with the metal clip member attached to the clip attachment section of the second unit cell. When the first and second unit cells are stacked together to form a stacked body, the metal clip members are not overlapped in the stacking direction. Thus, the dimension of the stacked body in the stacking direction is not large.

Each of the first and second separators may include a metal plate and an insulating section of insulating resin or insulating coating formed at an outer end of the metal plate. The metal clip member is attached to the insulating section of the first separator and the insulating section of the second separator. With the simple and inexpensive structure, the short circuit between the first and second separators through the metal clip member is prevented, and the desired power generation performance can be maintained.

The first and second separators may include curved ends, respectively. The curved ends of the first and second separators are curved or bent away from each other at the insulating sections of the first and second separators. Therefore, it is possible to effectively prevent the metal clip member from being detached from the first and second separators.

The curved end may include the insulating section of insulating resin or insulating coating formed at the outer end of the metal plate. In this case, the structure of the curved end is simple.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
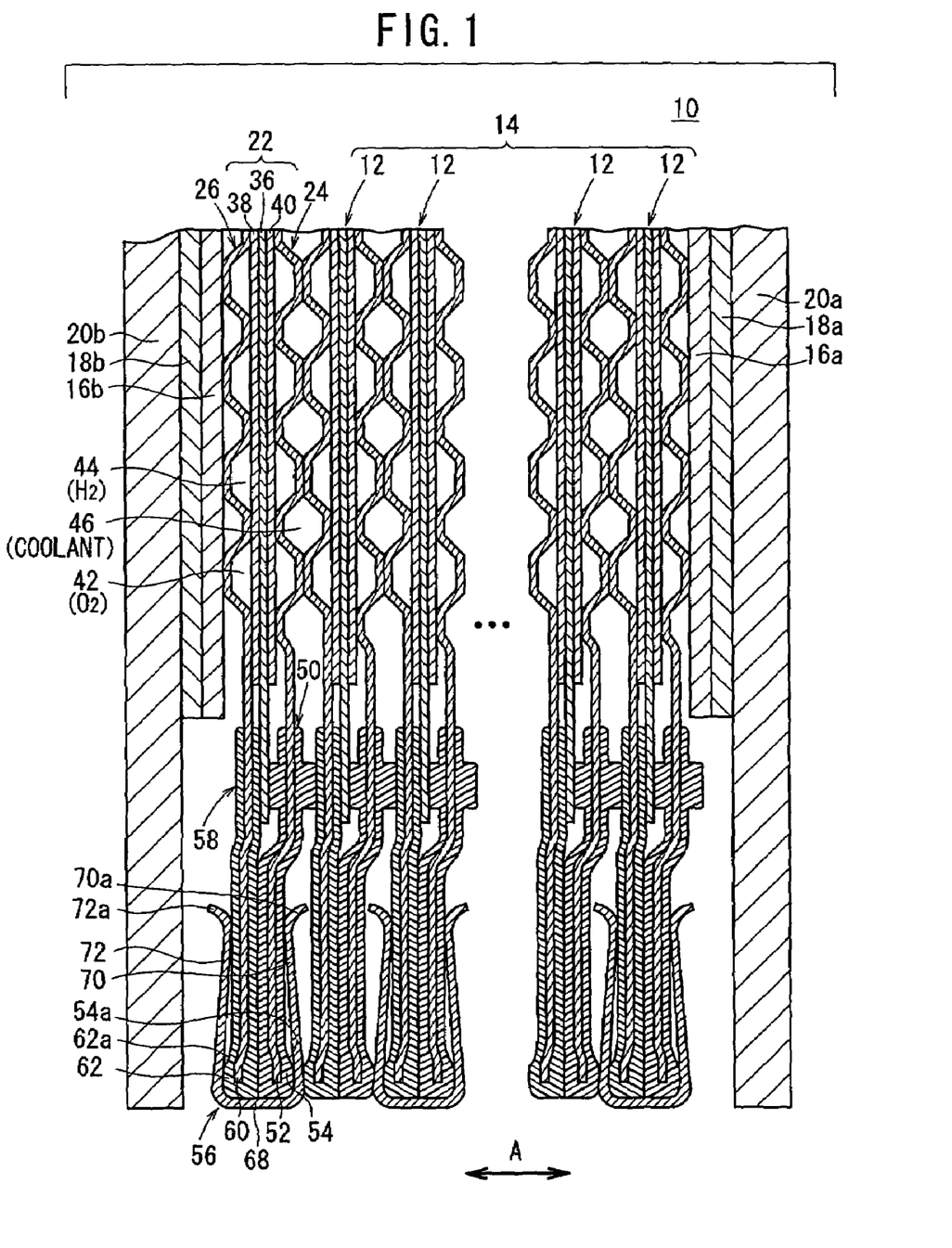
FIG. 1 is a view schematically showing a fuel cell according to a first embodiment of the present invention.

FIG. 1 is a view schematically showing a fuel cell 10 according to a first embodiment of the present invention.

The fuel cell 10 includes a stacked body 14 formed by stacking a plurality of unit cells 12 in a direction indicated by an arrow A. Terminal plates 16a, 16b are provided on the outermost unit cells 12 at opposite ends of the stacked body 14, respectively. Insulating plate 18a, 18b are provided on the terminal plates 16a, 16b, respectively. Further, end plates 20a, 20b are provided on the insulating plates 18a, 18b, respectively. The end plates 20a, 20b are fastened by tie rods or the like (not shown) for tightening the unit cells 12 of the fuel cell 10 with a predetermined tightening force in the direction indicated by the arrow A.

Figure 2:
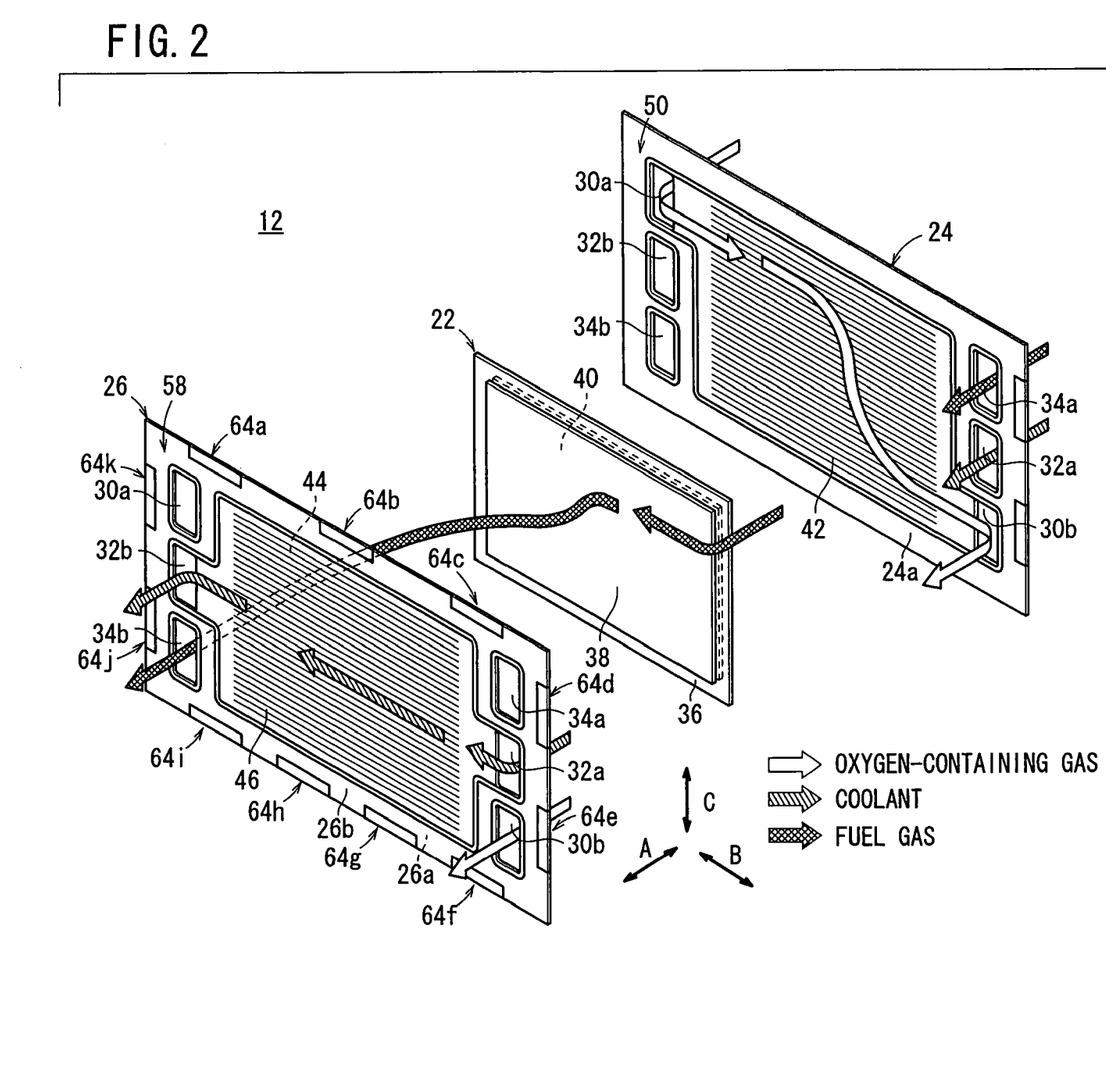
FIG. 2 is an exploded view schematically showing a unit cell of the fuel cell.

As shown in FIG. 2, the unit cell 12 includes a membrane electrode assembly (electrolyte electrode assembly) 22 and first and second metal separators 24, 26 for sandwiching the membrane electrode assembly 22.

At one horizontal end of the unit cell 12 in a direction indicated by an arrow B, an oxygen-containing gas supply passage 30a for supplying an oxygen-containing gas, a coolant discharge passage 32b for discharging a coolant, and a fuel gas discharge passage 34b for discharging a fuel gas such as a hydrogen-containing gas are arranged vertically in a direction indicated by an arrow C. The oxygen-containing gas supply passage 30a, the coolant discharge passage 32b, and the fuel gas discharge passage 34b extend through the unit cell 12 in the stacking direction indicated by the arrow A.

At the other horizontal end of the unit cell 12 in the direction indicated by the arrow B, a fuel gas supply passage 34a for supplying the fuel gas, a coolant supply passage 32a for supplying the coolant, and an oxygen-containing gas discharge passage 30b for discharging the oxygen-containing gas are arranged vertically in the direction indicated by the arrow C. The fuel gas supply passage 34a, the coolant supply passage 32a, and the oxygen-containing gas discharge passage 30b extend through the fuel cell 10 in the direction indicated by the arrow A.

The membrane electrode assembly 22 comprises an anode 38, a cathode 40, and a solid polymer electrolyte membrane (electrolyte) 36 interposed between the anode 38 and the cathode 40 (see FIGS. 1 and 2). The solid polymer electrolyte membrane 36 is formed by impregnating a thin membrane of perfluorosulfonic acid with water, for example.

Each of the anode 38 and cathode 40 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the anode 38 and the electrode catalyst layer of the cathode 40 are fixed to both surfaces of the solid polymer electrolyte membrane 36, respectively.

As shown in FIG. 2, the first metal separator 24 has an oxygen-containing gas flow field 42 on its surface 24a facing the membrane electrode assembly 22. The oxygen-containing gas flow field 42 includes a plurality of grooves extending straight in the direction indicated by the arrow B, for example. The oxygen-containing gas flow field 42 is connected to the oxygen-containing gas supply passage 30a at one end, and connected to the oxygen-containing gas discharge passage 30b at the other end.

The second metal separator 26 has a fuel gas flow field 44 on its surface 26a facing the membrane electrode assembly 22. The fuel gas flow field 44 includes a plurality of grooves extending straight in the direction indicated by the arrow B, for example. The fuel gas flow field 44 is connected to the fuel gas supply passage 34a at one end, and connected to the fuel gas discharge passage 34b at the other end.

As shown in FIG. 2, a coolant flow field 46 is formed between a surface 24b of the first metal separator 24 and a surface 26b of the second metal separator 26. The coolant flow field 46 includes a plurality of grooves extending straight in the direction indicated by the arrow B. Specifically, the coolant flow field 46 is formed by combining grooves on the first metal separator 24 and grooves on the second metal separator 26 when the first and second metal separators 24, 26 are stacked together. The coolant flow field 46 is connected to the coolant supply passage 32a at one end, and connected to the coolant discharge passage 32b at the other end.

First seal members (resin insulators) 50 are formed integrally on both surfaces 24a, 24b of the first metal separator 24, for example, by mold forming. The first seal member 50 on the surface 24a is provided around the oxygen-containing gas flow field 42 connected between the oxygen-containing supply passage 30a and the oxygen-containing gas discharge passage 30b. The first seal member 50 on the surface 24b is provided around the coolant flow field 46 connected between the coolant supply passage 32a and the coolant discharge passage 32b.

As shown in FIG. 1, a curved end 52 is provided at an outer end of the first metal separator 24. The curved end 52 is curved or bent away from the membrane electrode assembly 22. The first seal member 50 includes an insulating section 54 which covers the curved end 52. A metal clip member 56 described later is attached to the insulating section 54. The insulating section 54 has a step 54a which is curved or bent corresponding to the shape of the curved end 52. The step 54a prevents the disengagement of the metal clip member 56.

Second seal members (resin insulators) 58 are formed integrally on both surfaces 26a, 26b of the second metal separator 26, for example, by mold forming. The second seal member 58 on the surface 26b is provided around the fuel gas flow field 44 connected between the fuel gas supply passage 34a and the fuel gas discharge passage 34b. The second seal member 58 on the surface 24a is provided around the coolant flow field 46 connected between the coolant supply passage 32a and the coolant discharge passage 32b.

As shown in FIG. 1, a curved end 60 is provided at an outer end of the second metal separator 26. The curved end 60 is curved or bent away from the membrane electrode assembly 22. The second seal member 58 includes an insulating section 62 which covers the curved end 60. A metal clip member 56 is attached to the insulating section 62. The insulating section 62 has a step 62a which is curved or bent corresponding to the shape of the curved end 60.

The curved end 52 of the first metal separator 24 and the curved end 60 of the second metal separator 26 are curved or bent away from each other for preventing disengagement of the metal clip member 56 from the first and second metal separators 24, 26.

The curved ends 52, 60 of the first and second metal separators 24, 26 are curved away from each other. Thus, the rigidity of the outer ends of the first and second metal separators 24, 26 is improved. A plurality of the metal clip members 56 are used for holding the outer regions of the first and second metal separators 24, 26 of the unit cell 12 at a plurality of positions.

Figure 3:
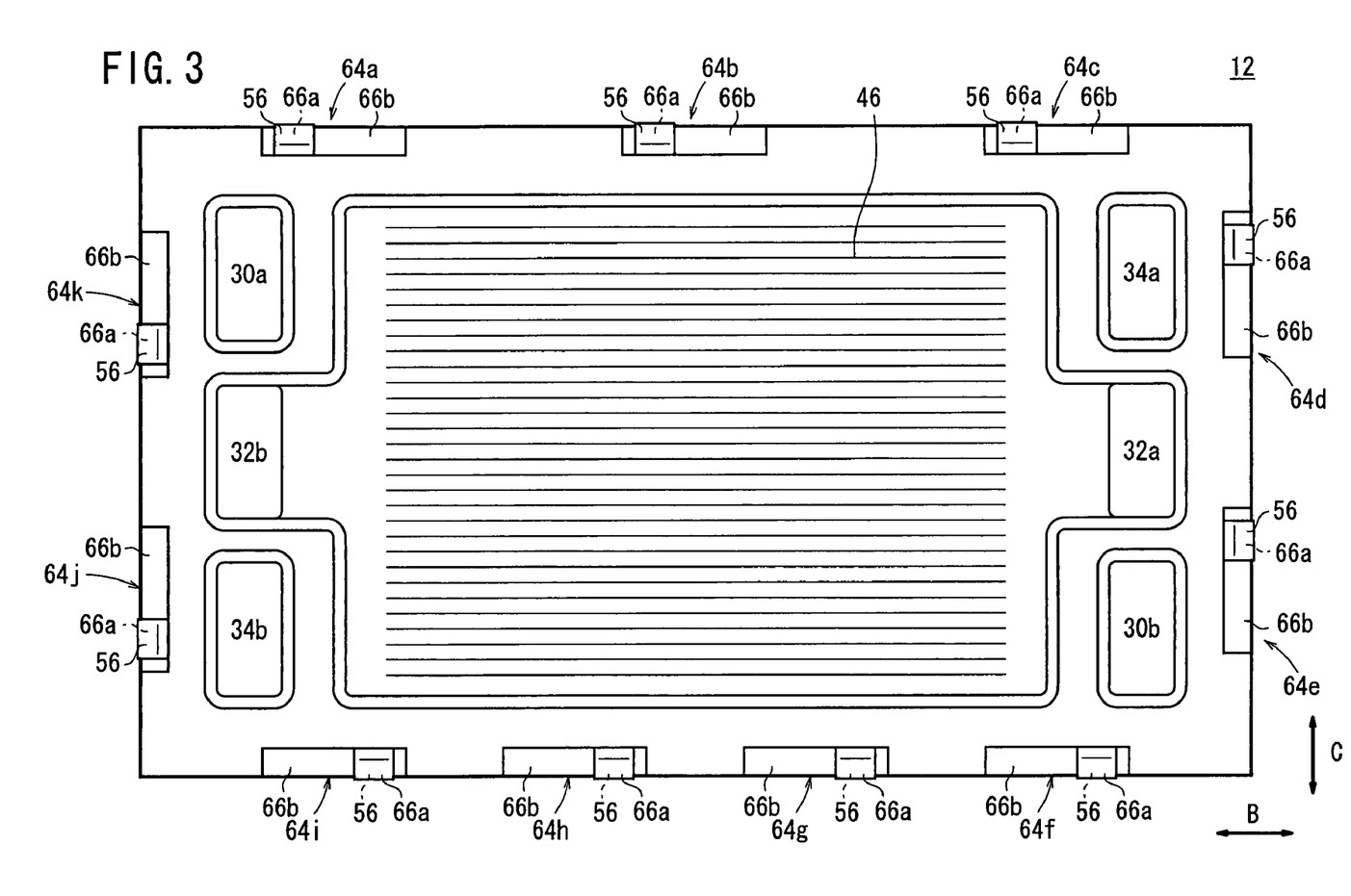
FIG. 3 is a front view showing the unit cell.

As shown in FIG. 3, clip attachment sections 64a through 64k are provided at predetermined positions in the outer region of the unit cell 12. Each of the clip attachment sections 64a through 64k includes first and second positions 66a and 66b. For example, the metal clip member 56 is selectively attached to one of first and second positions 66a and 66b of the clip attachment section 64a along the width in the direction indicated by the arrow B. Likewise, each of the clip attachment sections 64b through 64k includes first and second positions for selectively attaching the metal clip members 56.

Figure 4:
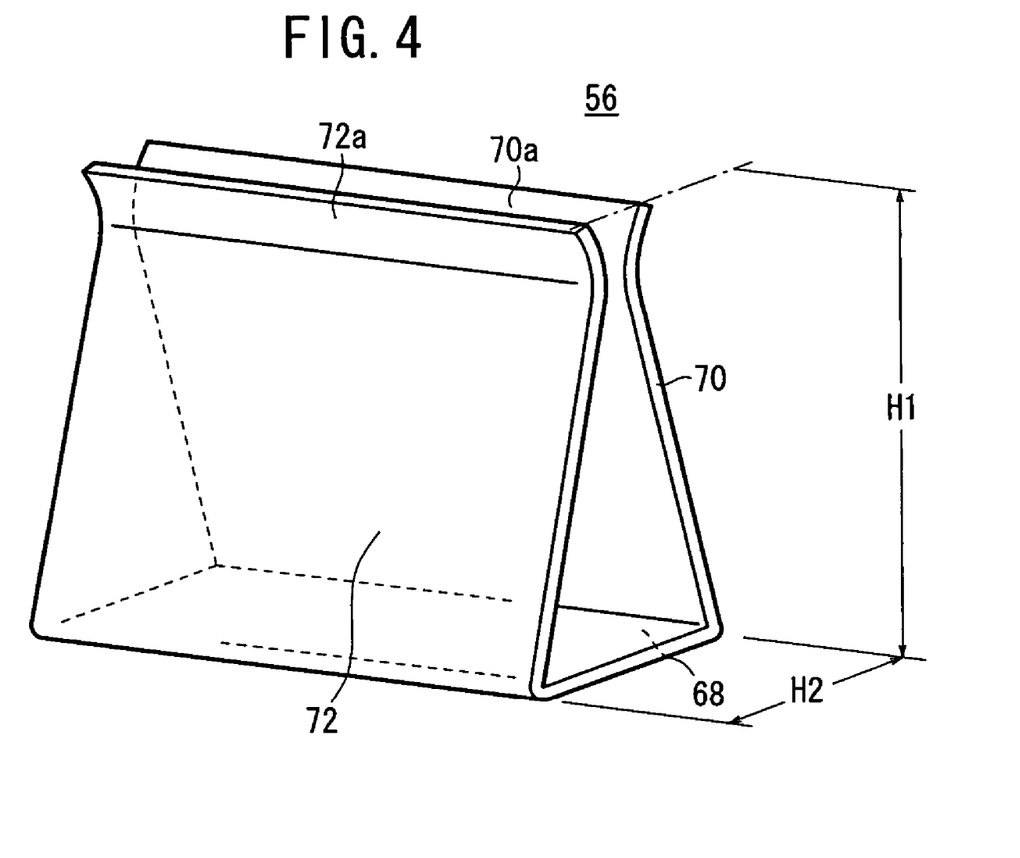
FIG. 4 is a perspective view showing a metal clip member.

As shown in FIG. 4, the metal clip member 56 is formed by bending a thin metal plate. The metal clip member 56 includes a side plate 68 and first and second holding portions 70, 72. The side plate 68 is bent at opposite ends, and the first and second holding portions 70, 72 are extending from the opposite ends of the side plate 68. The dimension H1 of the first and second holding portions 70, 72 is greater than the dimension (width) H2 of the side plate 68. The side plate 68, and the first and second holding portions 70, 72 generate a desired elastic force to tighten the unit cell 12 sandwiched between the first and second holding portions 70, 72. The first and second holding portions have edges 70a, 72a which are curved or bent away from each other.

Next, operation of assembling the fuel cell 10 will be descried.

Firstly, as shown in FIG. 2, the membrane electrode assembly 22 is sandwiched between the first and second metal separators 24, 26. Then, as shown in FIG. 3, the metal clip members 56 are attached at the first positions 66a of the clip attachment sections 64a through 64k, respectively.

In the first embodiment, the dimension H1 of the first and second holding portions 70, 72 of the metal clip member 56 is greater than the dimension (width) H2 of the side plate 68, and the side plate 68, and the first and second holding portions 70, 72 have the elasticity to generate the desired elastic force (see FIG. 4). Therefore, when the metal clip members 56 are attached at the first positions 66a, as shown in FIG. 1, the outer regions of the first and second metal separators 24, 26 are reliably held between the relatively long first and second holding portions 70, 72. The metal clip members 56 are not detached from the first and second metal separators 24, 26. Thus, the components of the unit cell 12 are securely fastened together.

Further, the first and second holding portions 70, 72 are long, and have a high elasticity to hold the first and second metal separators 24, 26 desirably. Therefore, when the first and second metal separators 24, 26 are held between the first and second holding portions 70, 72 for fastening the components of the unit cell 12, the sealing performance is maintained, and the unit cell 12 can be handled efficiently.

Further, the metal clip members 56 can be attached to the first and second metal separators 24, 26 simply by fitting the metal clip member 56 to the first and second metal separators 24, 26 at the first positions 66a. The components of the unit cell 12 can be assembled easily. The number of steps for assembling the unit cell 12 can be reduced significantly. The efficient assembling operation can be carried out easily. Further, in the unit cell 12, the membrane electrode assembly 22 is interposed between the first and second metal separators 24, 26. The humidity at the membrane electrode assembly 22 is kept at a desired level. The membrane electrode assembly 22 is not dried, and the desired performance of the unit cell 12 is maintained.

The edges 70a, 72a of the first and second holding portions 70, 72 are curved or bent away from each other. Thus, the first and second metal separators 24, 26 can be inserted between the edges 70a, 72a, smoothly. The metal clip members 56 can be attached to the first and second metal separators 24, 26 simply and reliably.

The first and second seal members 50, 58 cover the outer regions of the first and second metal separators 24, 26. The metal clip member 56 is attached to the insulating sections 54, 62 of the first and second seal members 50, 58. Thus, the short circuit between the first and second metal separators 24, 26 through the metal clip member 56 is prevented, and the desired power generation performance can be maintained.

The curved ends 52, 60 are provided at the outer ends of the first and second metal separators 24, 26, respectively. The curved end 52 of the first metal separator 24 and the curved end 60 of the second metal separator 26 are curved or bent away from each other. The curved ends 52, 60 are covered by the insulating sections 54, 62 of the first and second seal members 50, 58. The insulating sections 54, 62 have the steps 54a, 62a corresponding to the shapes of the curved ends 52, 60. The steps 54a, 62a effectively prevent the disengagement of the metal clip member 56 attached to the unit cell 12.

Figure 6:
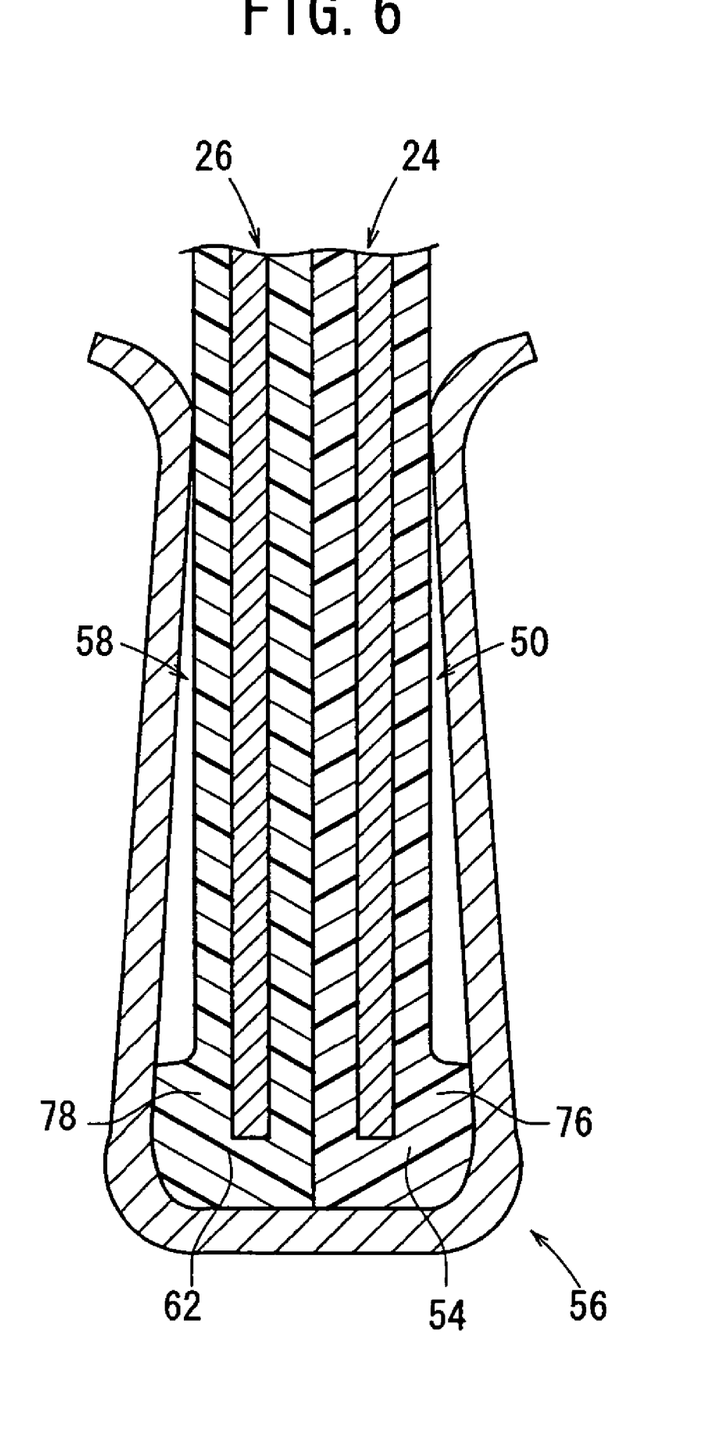
FIG. 6 is a cross sectional view partially showing curved ends of an alternative type.

In the first embodiment, the curved ends 52, 62 are provided at the outer ends of the first and second metal separators 24, 26. The embodiment can be modified depending on the application. For example, instead of using the curved ends 52, 60, in an alternate embodiment shown in FIG. 6, curved insulating sections 76, 78 may be provided as the insulating sections 54, 62 by insulating resin or insulating coating for insulating the outer ends of the first and second metal separators 24, 26.

Then, another unit cell (second unit cell) 12 is stacked on the unit cell 12. The metal clip members 56 are attached to the second positions 66b of the clip attachment sections 64a through 64k (see FIG. 5) of the second unit cell 12. Further, still another unit cell (third unit cell) 12 is provided on the second unit cell 12. The metal clip members 56 are attached to the first positions 66a of the clip attachment sections 64a through 64k of the third unit cell 12.

Figure 5:
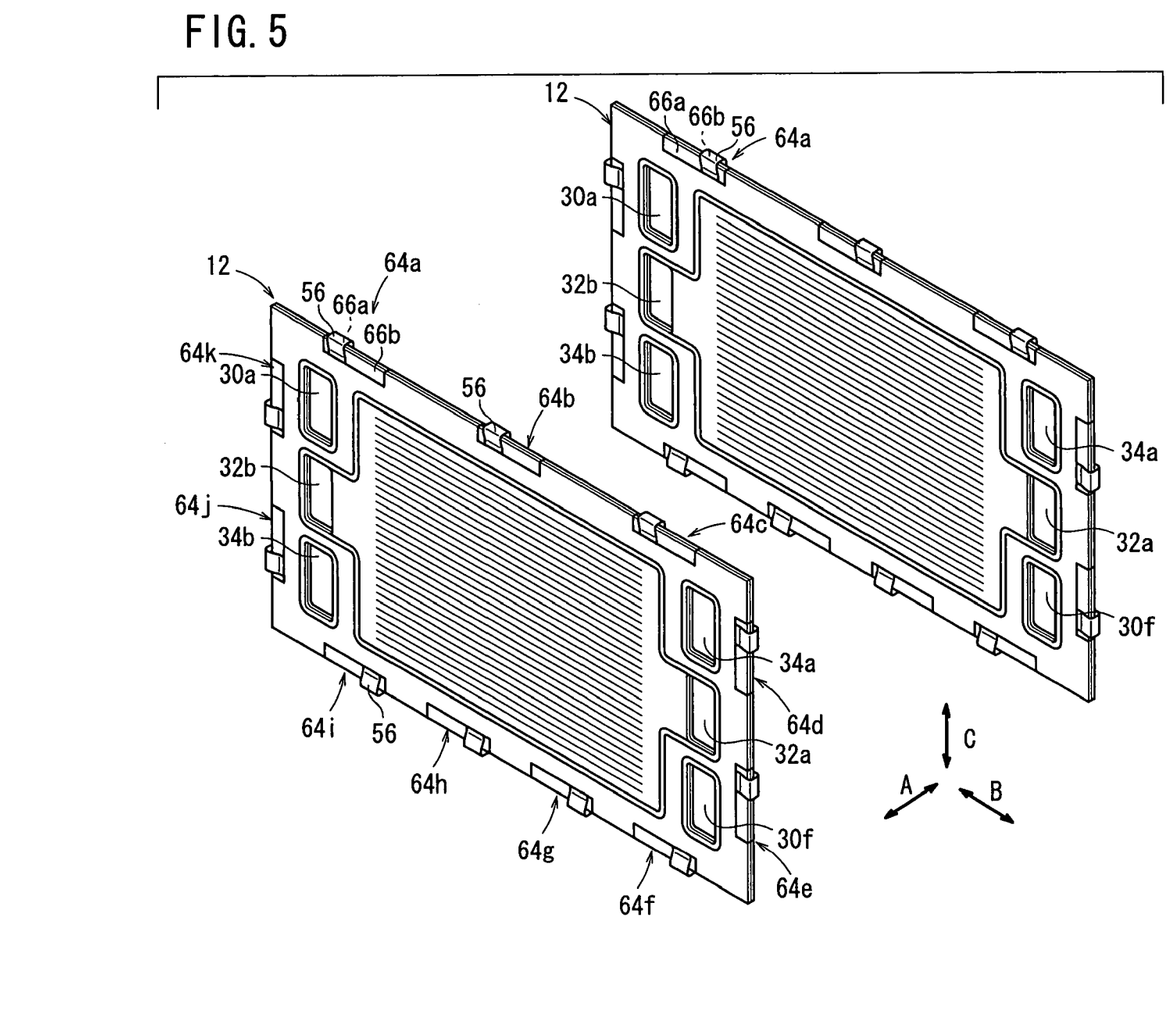
FIG. 5 is a perspective view showing the unit cells which are to be stacked together.

Thus, when a plurality of the unit cells 12 are stacked together to form the stacked body 14, the metal clip members 56 attached to the respective unit cells 12 are out of alignment with each other, and are not overlapped in the stacking direction. Thus, the dimension of the stacked body 14 in the stacking direction is not large.

After a predetermined number of the unit cells 12 are stacked together in the direction indicated by the arrow A to form the stacked body 14, the terminal plates 16a, 16b are provided outside the stacked body 14. Then, the insulator plates 18a, 18b are provided outside the terminal plates 16a, 16b, and the end plates 20a, 20b are provided outside the terminal plates 16a, 16b. The end plates 20a, 20b are tightened together by tie rods or the like (not shown). In this manner, the fuel cell 10 is assembled.

Next, operation of the fuel cell 10 will be described below.

Referring to FIG. 1, in the fuel cell 10, an oxygen-containing gas such as air, a fuel gas such as a hydrogen-containing gas, and a coolant such as pure water, an ethylene glycol or an oil are supplied to the stacked body 14 formed by stacking a predetermined number of the unit cells 12.

As shown in FIG. 2, in each of the unit cells 12, the oxygen-containing gas flows from the oxygen-containing gas supply passage 30a into the oxygen-containing gas flow field 42 of the first metal separator 24. The oxygen-containing gas flows in the direction indicated by the arrow B along the cathode 40 of the membrane electrode assembly 22 to induce a chemical reaction at the cathode 40. The fuel gas flows from the fuel gas supply passage 34a into the fuel gas flow field 44 of the second metal separator 26. The fuel gas flows in the direction indicated by the arrow B along the anode 38 of the membrane electrode assembly 22 to induce a chemical reaction at the anode 38.

In the membrane electrode assembly 22, the oxygen-containing gas supplied to the cathode 40, and the fuel gas supplied to the anode 38 are consumed in the electrochemical reactions at catalyst layers of the cathode 40 and the anode 38 for generating electricity.

After the oxygen-containing gas is consumed at the cathode 40, the oxygen-containing gas flows into the oxygen-containing gas discharge passage 30b, and flows in the direction indicated by the arrow A. Similarly, after the fuel gas is consumed at the anode 38, the fuel gas flows into the fuel gas discharge passage 34b, and flows in the direction indicated by the arrow A.

The coolant supplied to the coolant supply passage 32a flows into the coolant flow field 46 between the first and second metal separators 24, 26, and flows in the direction indicated by the arrow B. After the coolant is used for cooling the membrane electrode assembly 22, the coolant is discharged into the coolant discharge passages 32b.

In the first embodiment, the first and second seal members 50, 58 are provided on the first and second metal separators 24, 26. However, the embodiment can be modified depending on the application. For example, insulating coating is utilized. Alternatively, carbon plates may be used instead of the first and second metal separators 24, 26.

Figure 7:
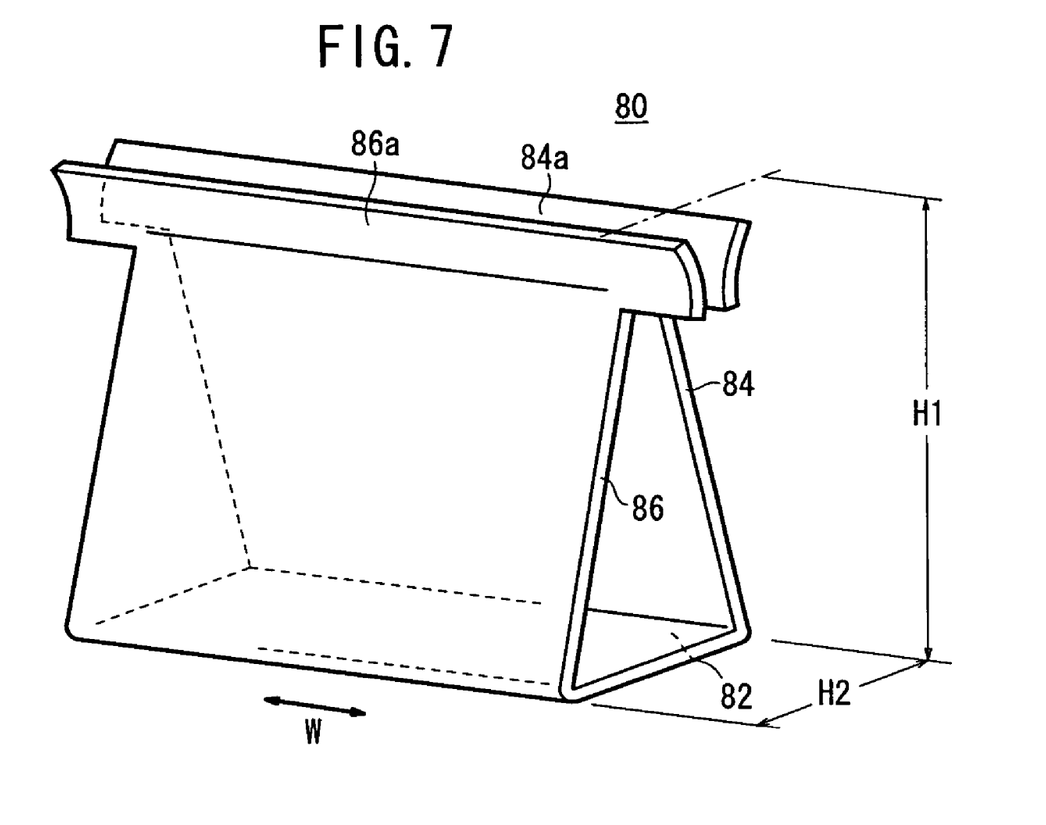
FIG. 7 is a perspective view showing a metal clip member of a fuel cell according to a second embodiment of the present invention.

FIG. 7 is a perspective view showing a metal clip member 80 of a fuel cell according to a second embodiment of the present invention.

The metal clip member 80 includes a side plate 82 and first and second holding portions 84, 86. The side plate 82 is curved at opposite ends, and the first and second holding portions 84, 86 are extending from the opposite ends of the side plate 82. The dimension H1 of the first and second holding portions 84, 88 is greater than the dimension (width) H2 of the side plate 82. Edges 84a, 86a of the first and second holding portions 84, 86 are curved or bent away from each other. The edges 84a, 86a protrude from opposite sides in a direction indicated by the arrow W for a predetermined distance.

Thus, the dimension of the edges 84a, 86a of the holding portions 84, 86 in the direction indicated by the arrow W is long, and the first and second metal separators 24, 26 are securely held between the edges 84a, 86a of the holding portions 84, 86.

Figure 8:
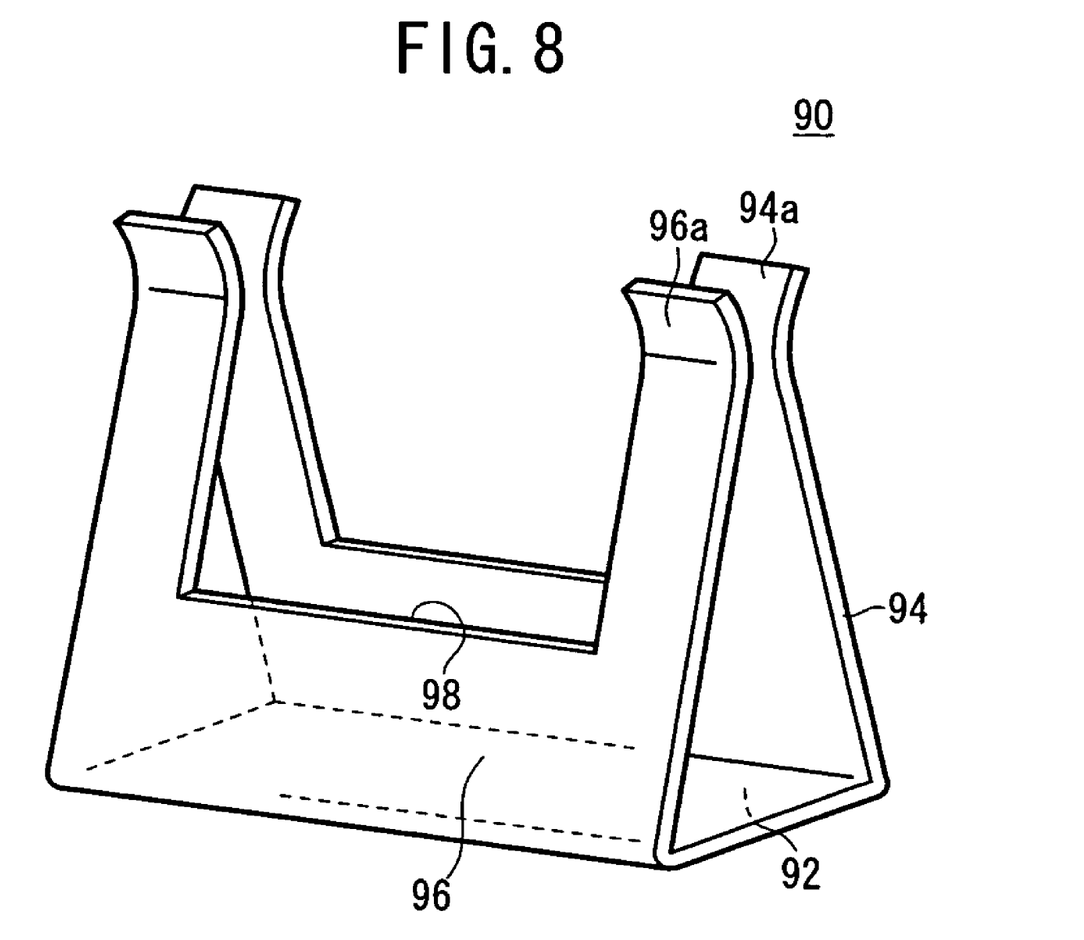
FIG. 8 is a view showing a metal clip member of a fuel cell according to a third embodiment of the present invention.

FIG. 8 is a perspective view showing a metal clip member 90 of a fuel cell according to a third embodiment of the present invention.

The metal clip member 90 includes a side plate 92, and first and second holding portions 94, 96. The side plate 92 is curved at opposite ends, and the first and second holding portions 94, 96 are extending from the opposite ends of the side plate 92. The length of the first and second holding portions 94, 96 is greater than the length of the side plate 92. A relatively large opening 98 is formed centrally in each of the first and second holding portions 94, 96. Edges 94a, 96a of the first and second holding portions 94, 96 are curved or bent away from each other.

Since the relatively large openings are formed in the first and second portions 94, 96 of the metal clip member 90, the metal clip member 90 has the lightweight. The overall weight of the fuel cell is small. In particular, when a large number of the unit cells 12 are stacked together, the weight of the fuel cell is reduced considerably.

According to the present invention, a metal clip member has relatively long first and second holding portions. The outer regions of first and second separators are securely fastened by the first and second holding portions. Therefore, it is possible to effectively prevent the metal clip member from being detached from the first and second separators. The first and second holding portions are long in comparison with a side plate of the metal clip member. Therefore, the first and second holding portions have the elasticity to securely tighten the first and second separators.

Thus, the unit cell can be assembled efficiently, and the number of steps for assembling the unit cell is small. The sealing performance can be maintained in handling the unit cell, and the unit cell can be handled efficiently.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell including first and second unit cells stacked together in a stacking direction, each of said first and second unit cells comprising:
    an electrolyte electrode assembly including a pair of electrodes and an electrolyte interposed between said electrodes;
    a pair of separators for sandwiching said electrolyte electrode assembly;
    a plurality of metal clip members for holding outer regions of said first and second separators at a plurality of positions; and
    a clip attachment section for attaching said metal clip member,
    wherein each of said metal clip members includes a side plate curved at opposite ends, and first and second holding portions extending from the opposite ends of said side plate;
    a length of said first and second holding portions is greater than a length of said side plate;
    said first and second separators are tightened together between said first and second holding portions; and
    said metal clip member attached to said clip attachment section of said first unit cell is not in alignment with said metal clip member attached to said clip attachment section of said second unit cell.

2. A fuel cell according to claim 1, wherein said first and second holding portions have edges curved or bent away from each other.

3. A fuel cell according to claim 2, wherein said edges of said first and second holding portions protrude from opposite sides of said first and second holding portions for a predetermined distance.

4. A fuel cell according to claim 2, wherein an opening is formed centrally in each of said first and second holding portions.

5. A fuel cell according to claim 1, wherein said clip attachment section includes first and second positions for selectively attaching said metal clip member to said clip attachment section at one of said first and second positions.

6. A fuel cell according to claim 1, wherein said pair of separators includes first and second separators, said first and second separators each comprising:
    a metal plate; and
    an insulating section formed of one of an insulating resin and an insulating coating disposed at an outer end of said metal plate,
    wherein said metal clip member is attached to said insulating section of said first separator and said insulating section of said second separator.

7. A fuel cell according to claim 6, wherein said first and second separators include curved ends, respectively; and
    said curved ends of said first and second separators are curved or bent away from each other at said insulating sections of said first and second separators for preventing disengagement of said metal clip member from said first and second separators.

8. A fuel cell according to claim 7, wherein said curved end includes said insulating section of insulating resin or insulating coating formed at said outer end of said metal plate.

* * * * *